May 2, 1961  J. F. GOLUBICS  2,981,995
SEPARABLE FASTENER
Filed Aug. 30, 1957  2 Sheets-Sheet 1
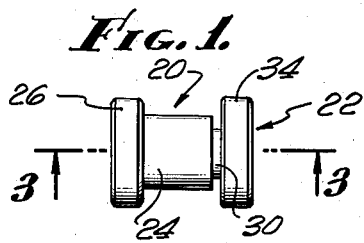
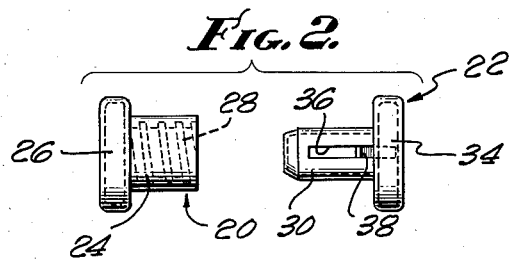
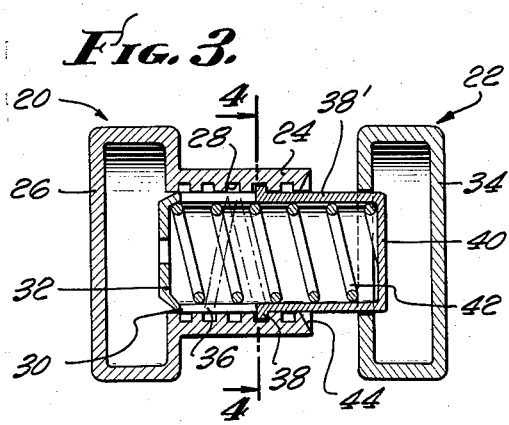
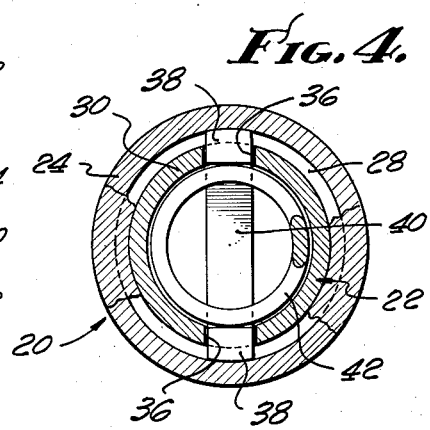
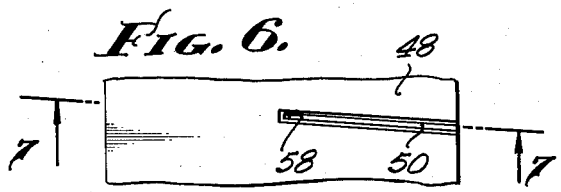
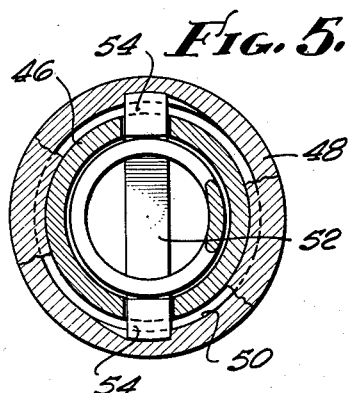
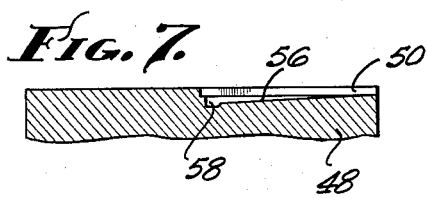
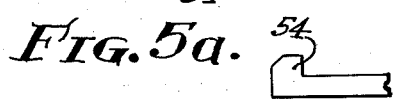
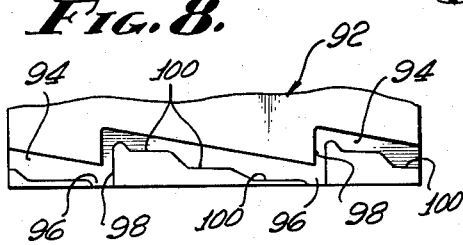
JOHN FRANCIS GOLUBICS,
INVENTOR.
BY
AGENT May 2, 1961    J. F. GOLUBICS    2,981,995
SEPARABLE FASTENER
Filed Aug. 30, 1957    2 Sheets-Sheet 2
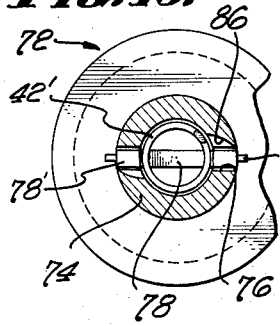
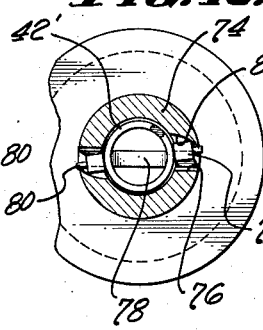
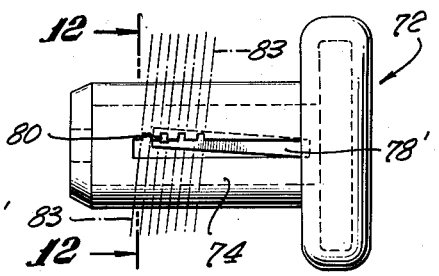
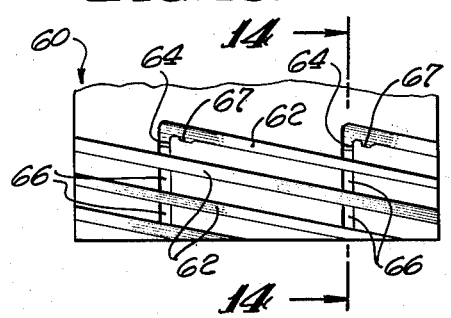
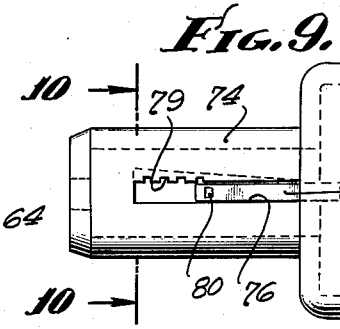
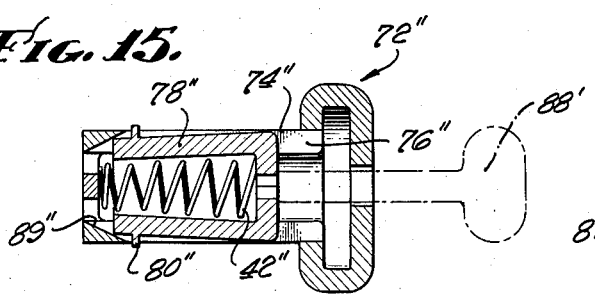
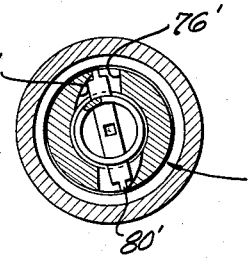
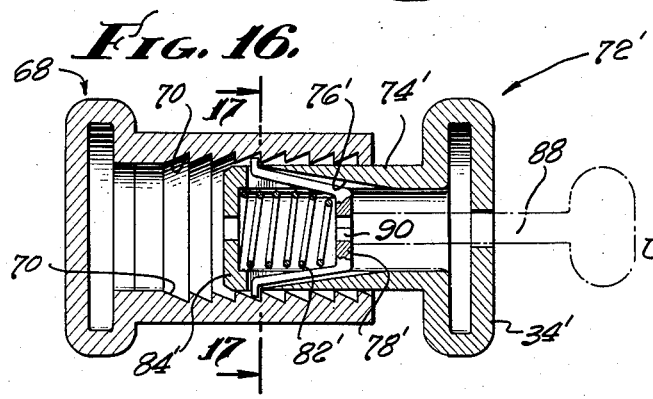
JOHN FRANCIS GOLUBICS,
INVENTOR.
BY *Wm. H. Maxwell*
AGENT United States Patent Office 2,981,995
Patented May 2, 1961

2,981,995
SEPARABLE FASTENER
John Francis Golubics, 953½ Robinson St., Los Angeles, Calif.
Filed Aug. 30, 1957, Ser. No. 681,411
7 Claims. (Cl. 24—221)

This invention relates to separable fasteners. It is one which is adapted for use in many fields where the releasable securing of relatively thin flat articles is desired. Depending upon the thickness of the articles or elements to be connected and the size of the fastener, it can be used for a loose leaf book binding, or it can be utilized to connect sets of keys, small tools, sets of gauges, swatches, samples and the like. It is not permanently locked as in the case of rivets, nor is it subjected to distortions which in turn distort the apertures in the materials through which it is inserted, as is true with some other types of fasteners.

One of the principal objects of the invention is to provide means whereby the articles to be connected are held with a compressive action inherent in the fastener structure adn wherein this action can be secured even though the same fastener is used at times for securing stacks of articles of different thicknesses. This adjustable clamping action is such that the device will effectively hold the articles to be held securely and will not become loose from shock, vibration or other accidental occurrences.

The present invention is an improvement upon the construction shown in my prior Patent No. 2,659,122, issued November 17, 1953, and entitled "Fastening Device."

The invention shown in my prior patent permitted a limited amount of expansion of the fastener to allow for slight variations in thickness of the stack of articles held by it. The present invention includes means for connecting different thicknesses over a much wider range. It includes, generally, a threaded interconnection of the fastener parts, wherein they can be held to different degrees of axial telescoping fit by reasons of the friction afforded by the manner of threaded interconnection.

The various objects and features of my invention will be fully understood from the following detailed description of typical preferred forms and applications of my invention, throughout which description reference is made to the accompanying drawings, in which:

Fig. 1 is a side elevational view of an embodiment of the invention with the parts connected. Fig. 2 is an exploded view of the structure of Fig. 1. Fig. 3 is an enlarged longitudinal sectional view through the device taken as indicated by line 3—3 on Fig. 1. Fig. 4 is an enlarged section taken approximately on line 4—4 of Fig. 3. Fig. 5 is a transverse sectional view through a modified form of connector. Fig. 5ᵃ is an enlarged detailed side view of a portion of the structure shown in Fig. 5. Fig. 6 is a diagrammatic view of a portion of the interior wall of the female member of Fig. 5 as it would be seen if laid out flat. Fig. 7 is a diagrammatic sectional view taken on line 7—7 of Fig. 6. Fig. 8 is a diagrammatic view similar to Fig. 6 and showing the interior of another modified female member. Fig. 9 is a side elevational view of a modification of the male member of the fastener construction provided by the present invention and showing certain parts in an unactuated position. Fig. 10 is a sectional view taken as indicated by line 10—10 on Fig. 9. Fig. 11 is a view similar to Fig. 9 and showing parts of the male member in an actuated position. Fig. 12 is a sectional view taken as indicated by line 12—12 on Fig. 11. Fig. 13 is a view similar to Figs. 6 and 8 and showing the interior of another modified female member. Fig. 14 is a sectional view taken as indicated by line 14—14 on Fig. 13. Fig. 15 is an enlarged longitudinal sectional view of another form of male member provided by the invention. Fig. 16 is an enlarged longitudinal sectional view of another modification of a socket and a male member such as in Fig. 15. Fig. 17 is a sectional view taken substantially on the line 17—17 on Fig. 16.

Figs. 1 through 4 show one embodiment of the invention. It includes a female member 20 and an inwardly telescoping member 22, which is the male portion of the fastener or connector. The member 20 has a hollow tubular shank 24 and a head 26 on its left end. The interior of the shank 24 is provided with a double helical thread 28 which is preferably square in cross section, thereby providing thread valley portions at diametrically opposite points within the shank. For reasons to become apparent, the helical-threads 28 have a short lead.

The male member 22 is shown in Fig. 3 to be hollow, and is formed from a tubular shank 30 having an upset end 32 and an enlarged head 34 at its opposite end. Opposite wall portions of the shank 30 are provided with longitudinal slots 36 to receive therethrough, screw follower arms 38. The screw follower arms are preferably in the form of a U-shaped member 40 shiftably carried by the shank 30 and, as shown, the sides 38' of the follower member 40 extend parallel with the shank and have sliding engagement within the slots 36 in the shank. A compression spring 42 has one end seated in the U-shaped member 40 and its other end bears against the inside of the upset end 32 of the shank 30. The spring 42 is approximately the same in outside diameter as the interior of the shank 30 and when the spring is compressed it increasingly fills the interior of the shank 30 to engage between the sides 38' of the screw follower and in such a manner as to prevent inward radial shifting or deflection of the sides 38'.

When the telescoping members 20 and 22 are placed one within the other by engaging the screw follower's arms 38 in the threads 28 and turning the male member or holding it and turning the female member, the screw follower arms 38 will, of course, follow the two threads in the female member and the action of the spring 42 will cause the screw follower arms to bear against a side wall of the threads 28. This frictional engagement with the threads holds the two connector members 20 and 22 together against any accidental displacement, thereby preventing the parts from becoming separated.

It will be noted that the right, or open end of the female member 20 is tapered inwardly at 44 at its inside. This permits the male member 22 to be started into the member 24 without requiring matching or registering of the screw follower arms 38 with the ends of the threads 28. This feature greatly simplifies connecting of the two parts of the connector.

Attention is also called to the fact that there is a relatively large surface contact area between the screw follower arms 38 and the side walls of the threads. This, coupled with the use of a square thread construction, provides the necessary frictional holding of the members 20 and 22 to prevent them from unscrewing accidentally. The advantage of the square thread is that the spring thrust is axial against it and produces greater holding power in a thread of short lead and the flat ends of the screw follower arms 38 bear flatly against the thread walls.

The enlarged ends 26 and 34 of the members 20 and 22 may be kerfed, knurled or otherwise treated to facilitate turning of the telescoping members.

Figs. 5, 6 and 7 show another form of the invention, Figs. 6 and 7 being diagrammatic views as above specified. This embodiment includes male and female members 46 and 48 similar to members 20 and 22 of the first embodiment. The only difference between the two constructions is that there is a single thread 50 and the thread follower 52 has arms 54 slightly offset axially (not shown) of the connector so that the ends of the arms will lie in the single thread 50 of the female member 48 at points 180° apart in said single thread. It will be seen that the thread 50 has an increasingly deepened portion 56 which terminates in a socket 58 at the inner end of the thread to releasably retain one of the follower arms 54. The sides of the follower, in this form of the invention, are forwardly divergent to a slight degree (see Fig. 5), so that it must be sprung inwardly upon insertion of the member into the female member and so that it will spring outwardly and engage in the socket 58 when it is fully engaged. The remainder of the construction and operation of the fastener is the same as this in the previous embodiment.

Fig. 8 illustrates another type of female member 92. It is provided with partial thread grooves 94 having two entrant portions 96 located 180° apart, and two axial exit grooves 98 located 180° apart. The thread grooves 94 are provided, in their side walls which lie closer to the entrant end of the female member 92, with a plurality of steps 100. These steps furnish retaining rests for the thread follower arm in the male members such as previously described, so that the two telescoping members can be releasably secured at various positions of telescopic action. Continued rotation of one member relative to the other will cause the follower to ride from step to step deeper into the groove 94 until the follower reaches the exit groove 98, whereupon the male member can be quickly withdrawn.

Figs. 13 and 14 show a modified form of female member 60 which has a plurality of parallel squared threads 62. Each of the threads 62 is provided with a notch 64 at its inner terminal end which notch faces away from the open end of the female member to receive and hold the thread follower of the male member and serves as a stop means for reversely turning the thread follower of the male member as will be described in connection with the form of male member illustrated in Figs. 9 through 12. Then, when the thread follower is reversely rotated, its out-turned ends (at 80 in Fig. 9), are shifted radially inward and are lodged in one of the notches 79 at one side of the slot 76 of the male member 72.

The member 60 also is provided with sets of aligned axially disposed channels 66 which are formed in the radially inwardly disposed face of the female member and communicate with the notches 64 at the ends of the threads 62. These channels 66 provide exit grooves from notches 64 at the inner ends of the two square threads 62 as illustrated in Fig. 13. The channels 66 are somewhat shallower than the threads and notches 62 and 64 so that a thread follower on a male member cannot be withdrawn axially from the female member 60 until the thread follower portions are partially drawn or shifted radially inwardly.

A male member and thread follower which can be used in connection with the structures illustrated in Figs. 8 and 13 is illustrated in Fig. 11 and will be described below.

In the form of the invention now under consideration and illustrated in Figs. 13 and 14, it is desirable to provide orienting or positioning notches 67 in the threads 62, at the inner end portions of the threads, which notches are spaced a short distance from the notches 64 and face away from the open end of the female member. The notches 67 serve to receive and stop the out-turned ends 80 of the follower, just before the follower is fully engaged and the ends 80 thereof enter the notches 64. By providing the notches 67, it is possible, when engaging the male and female members, to determine, by feel, when the follower has reached an approximately fully engaged position. In practice, when orienting notches 67 are provided, it is desirable to leave the follower engaged therein, and not advance the follower further and into the notches 64, until such time as it is desired to disconnect the fastener.

In Figs. 9 through 12 of the drawings, the male fastener is shown with its shank 74 provided with a pair of oppositely disposed longitudinal slots 76 adapted to accommodate the side portions 78' of the U-shaped follower 78. The slots 76 are provided at one side thereof with wall portions which are cut away on a taper to establish cam faces 89 upon which the side portions 78' of the follower members ride, when the shank 74 is rotated relative to the follower, to shift the said side portion 78' and the end 80 of the follower radially inwardly a sufficient distance so that they can be freely shifted longitudinally through the channels 66 in the member 60 and out of engagement with the female member.

Rotation of the shank 74 relative to the follower 78 is achieved and/or made possible when the ends 80 of the follower are advanced into engagement in the notches 64 at the ends of the threads 62 in the member 60. It will be apparent that when the ends 80 of the follower are engaged in the notches 64 in the manner set forth above, the ends 80 of the follower are positively held against rotation by the longitudinal side walls of the notches. It will be further apparent that when the ends 80 of the follower are thus engaged, and the male member is urged and turned reversely, as set forth above, the sides of the follower are caused to spring or yield circumferentially and to ride radially inwardly on the cam faces, thereby shifting the ends 80 of the follower out of engagement in the notch 64 a sufficient distance to permit them to freely enter the longitudinal channel 66 in the female member.

When the follower is caused to ride on the cam faces 89 in the manner set forth above, the side portions 78' are yieldingly urged and/or are sprung a slight amount circumferentially of the shank 74 of the male member, as clearly illustrated in Figs. 11 and 12 of the drawings.

In the form of male member illustrated in Figs. 9 through 12 of the drawings, the spring 42' is slightly less in outside diametric extent than the interior of the shank to allow for radial inward shifting of the side portion of the follower.

In the preferred carrying out of the invention, and to maintain the end portions 80 of the follower in their retracted position, suitable longitudinally spaced notches 79 are provided along the sides of the notches in which the cam faces 89 are provided. The notches 79 are adapted to receive the ends 80 of the follower, when it is sprung radially inwardly and circumferentially in the manner set forth above and serve to hold the follower in said retracted condition.

Broken lines 83 diagrammatically illustrate the relationship of the notches 79 to thread grooves 62 of a female member, such as the member 60 in Figs. 13 and 14.

Figs. 16 and 17 show a construction in which the female member 68 is provided with a plurality of V-shaped parallel internal circumferential grooves 70. The tapered sides of the grooves 70 face generally to the open end of the female member while the squared faces defining the grooves 70 face toward the inner end of the female member.

The male member 72', in this form of the invention is provided with a shank 74' having slots 76' extending longitudinally along opposite sides thereof. Within the tubular shank 74' is a U-shaped follower member 78' having oppositely and radially outwardly extending ends 80' which are positioned outwardly of the slots 76' and are adapted to engage the walls of the grooves 70 when compressed to desired tension. A spring 82' is seated between the upset end 84' of the male member 72' and the inner side of the bridge of the U-shaped member 78'.

In the form of the invention shown in Figs. 16 and 17 each of the slots 76' in the male member 72' is provided at one side thereof with a cam face 89' similar to the cam face 89 in the form of the invention illustrated in Figs. 9 through 12 of the drawings, and so that the U-shaped member 78' can be partially rotated relative to the male member 72', as by a key 88 inserted in a squared socket 90 in the U-shaped member 78'. This rotative force applied to the U-shaped member 78', while holding the male member 72, will cause the arms of the U-shaped member 78' to ride upon the cam face 89' of each groove 76' and cause the extended ends 80' of the U-shaped member to be withdrawn inwardly towards each other and out of engagement with the walls of the grooves 70, thereby permitting the male member to be quickly and easily withdrawn from the female member 68. The retracted position of the extended ends 80 of the U-shaped member 78' is shown in Fig. 17.

In this form of the invention and when the fastener is engaged with a piece of work, the male member 72' is urged into engagement in the female member, by the application of pressure on the enlargement or head 34' of the male member. After the male member is fully engaged in the female member, additional pressure can be applied to the key 88 to shift the follower forwardly relative to the male member and thereby cause the ends of the follower to engage in the next groove 70 in the female member when normal engagement of the male and female members falls just short of engagement of the follower with the said next groove.

In Fig. 15 of the drawings, I have illustrated still another form of male member 72" adapted to be related with a female member such as is illustrated in Figs. 16 and 17. In this form of male member, the shank 74" is provided with slots 76" in which the forwardly disposed follower 78" is engaged. Forwardly convergent cam faces 89" are provided at the forward ends of the slots 76" and a key 88' is provided on the follower to project rearwardly therefrom where it can be engaged by the hand of the operator. With this relationship of parts, it will be apparent that when it is desired to remove the male member 72" from the female member in which it is engaged, the operator simply engages the key 88' and urges it forwardly relative to the male member and against the pressure exerted by the spring 42, thereby causing the forward ends of the side portions 78" of the follower to shift into engagement with the cam faces 89' and to be shifted radially inwardly thereby, as clearly illustrated in the drawings. Shifting of the follower in the manner set forth above, shifts the thread engaging parts 80" of the follower inwardly and out of engagement with the threads or grooves of the female member and allows for free withdrawal of the male member from the female member.

It will be seen that in all embodiments of the invention, the parts are connected by means of a tensioned thread follower or its equivalent, engaging a portion of a thread to hold the parts against accidental separation. In the first two embodiments the two main parts of the fastener are held by frictional engagement of the follower against the thread at any point along the thread, thereby providing a certain latitude of telescopic positioning of one of the members relative to the other. In the embodiment of Figs. 1 through 4, the engagement is entirely by friction. In the embodiments of Figs. 5 through 7, 8 and of Figs. 9 through 14, recesses or notches are provided to lock or set the connector in certain predetermined positions while the connector is held by frictional engagement of the follower with the threads in other positions.

The principal advantage of the invention is found in the ability to secure the adjustably-held telescopic positioning of the two members. This is an important feature since it permits the securing of two or more sheets of material wherein the combined thicknesses of the sheets may vary to a great extent. The two members are capable of quick and easy connection and separation and the connected structure is tightly held, even though the thickness of the joined sheets may be different.

Having described only typical preferred forms and applications of my invention I do not wish to be limited or restricted to the specific details herein set forth, but wish to reserve to myself any variations or modifications that may appear to those skilled in the art and fall within the scope of the following claims.

Having described my invention, I claim:

1. A separable fastener including, a first member with a helical thread therein having a plurality of turns, a second member slidably telescoped with the first member and having an element movable axially relative thereto and with a radially disposed part adapted to engage with the helical thread in the surrounding first member, means yieldingly urging said element axially of the second member, whereby turning of the first member relative to the second member compresses the said means to urge said members into pressured engagement.

2. A separable fastener including, a first member with a helical thread therein having a plurality of turns, a second member slidably telescoped with the first member and having a longitudinally disposed slot with an element carried therein and movable axially relative thereto and with a radially disposed part adapted to engage with the helical thread in the surrounding first member, means yieldingly urging said element axially of the second member, whereby turning of the first member relative to the second member compresses the said means to urge said members into pressured engagement.

3. A separable fastener including, a first tubular member with a helical thread therein having a plurality of turns, a second member slidably telescoped within said first tubular member, the second member having a longitudinally disposed slot with an element carried therein and movable axially relative thereto and with a radially disposed part adapted to frictionally engage with the helical thread in the surrounding wall of the first tubular member, means yieldingly urging said element axially of the second member, the second member compressing the said means to urge said members into pressured engagement, said helical thread and radially disposed part being frictionally engaged to secure the said part at any selected rotative position.

4. A separable fastener including, a first tubular member with a helical thread therein having a plurality of turns, a second tubular member slidably telescoped within the first tubular member, the second tubular member having a longitudinally disposed slot in the wall thereof, an element slidably carried in the slot and movable axially of said second member and with a radially disposed part adapted to engage with the helical thread in the surrounding wall of the first tubular member, a spring means yieldingly urging said element axially of the second tubular member, whereby turning of one member relative to the other compresses the spring to urge the members into pressured engagement.

5. A separable fastener including, a first tubular member with a helical thread therein having a plurality of turns, a second tubular member slidably telescoped within the first tubular member, the second tubular member having opposite longitudinally disposed slots in the wall thereof, an element slidably carried in the slots and movable axially of said second member and having diametrically opposite radially disposed parts adapted to engage with the helical threads in the surrounding wall of the first tubular member, a spring yieldingly urging said element axially of the second tubular member, whereby turning of one member relative to the other compresses the spring to urge the members into pressured engagement.

6. A separable fastener including, first and second members in slidable telescopic relation with each other, one member having an element movable axially relative thereto and with a radially disposed part adapted to engage with the other member, means yieldingly urging said element axially of the member in which it is carried, and a thread of multiple turns in said other member adapted to engage the said part, whereby turning of the first and second members relative to each other compresses said means to urge said members into pressured engagement.

7. A separable fastener including, a first tubular member with a helical thread therein having a plurality of turns, a second tubular member slidably telescoped within the first tubular member, the second tubular member having opposite longitudinally disposed slots in the wall thereof, an element slidably carried in the slots and movable axially of said second member and with diametrically opposite radially disposed parts adapted to engage with opposite helical cams in the surrounding wall of the first tubular member, a spring means yieldingly urging said element axially of the second tubular member, whereby turning of the second member relative to the threads in the first tubular member compresses the spring means to urge the members into pressured engagement.

References Cited in the file of this patent

UNITED STATES PATENTS

| | | |
|---|---|---|
| 314,795 | Cables | Mar. 31, 1885 |
| 321,646 | Schoonmaker | July 7, 1885 |
| 629,093 | Scalf | July 18, 1899 |
| 1,056,452 | Remhilt | Mar. 18, 1913 |
| 1,247,411 | Laible | Nov. 20, 1917 |
| 1,325,003 | Cushman | Dec. 16, 1919 |
| 1,563,350 | Field et al. | Dec. 1, 1925 |
| 1,690,456 | Payne et al. | Nov. 6, 1928 |
| 2,585,233 | Dzus | Feb. 12, 1952 |
| 2,659,122 | Golubics | Nov. 12, 1953 |

FOREIGN PATENTS

| | | |
|---|---|---|
| 10,975 | Great Britain | 1906 |